Nov. 23, 1965  L. B. ALEXANDER ET AL  3,218,962
APPARATUS FOR EXTRACTING JUICE FROM CITRUS FRUIT
Filed Dec. 8, 1961  5 Sheets-Sheet 1

INVENTORS
L. BRUCE ALEXANDER
RICHARD A. ANDREWS
BY
Paul A. Weilein
ATTORNEY

Nov. 23, 1965   L. B. ALEXANDER ET AL   3,218,962
APPARATUS FOR EXTRACTING JUICE FROM CITRUS FRUIT
Filed Dec. 8, 1961   5 Sheets-Sheet 3

INVENTORS
L. BRUCE ALEXANDER
RICHARD A. ANDREWS
BY
Paul A. Weilein
ATTORNEY

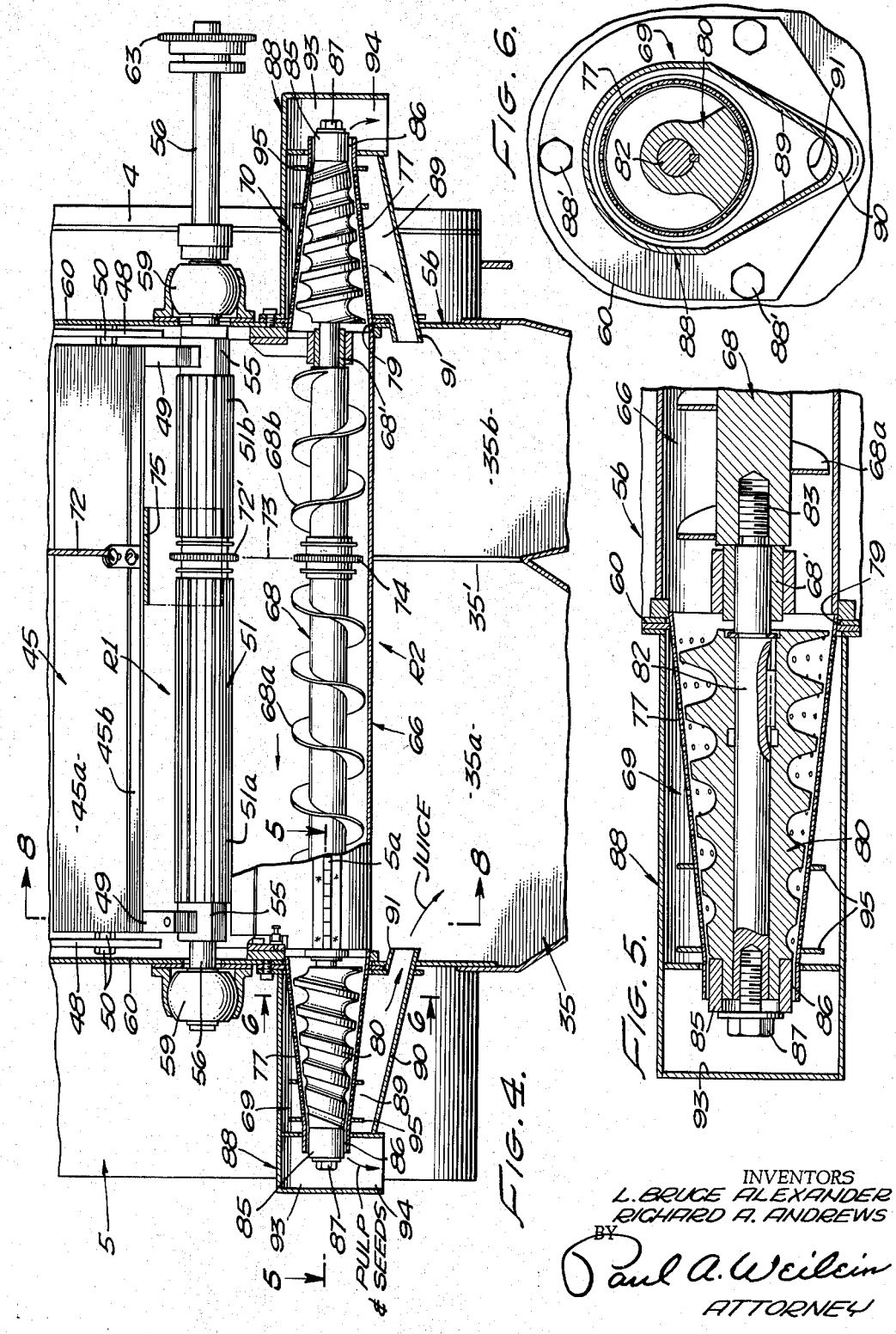

Nov. 23, 1965  L. B. ALEXANDER ET AL  3,218,962
APPARATUS FOR EXTRACTING JUICE FROM CITRUS FRUIT
Filed Dec. 8, 1961

INVENTORS
L. BRUCE ALEXANDER
RICHARD A. ANDREWS
BY
Paul A. Weilein
ATTORNEY

United States Patent Office 3,218,962
Patented Nov. 23, 1965

3,218,962
APPARATUS FOR EXTRACTING JUICE
FROM CITRUS FRUIT
L. Bruce Alexander, San Marino, and Richard A. Andrews, Whittier, Calif., assignors to Brown Citrus Machinery Corp., Whittier, Calif., a corporation of California
Filed Dec. 8, 1961, Ser. No. 157,935
26 Claims. (Cl. 100—117)

This invention relates to certain improvements in apparatus for extracting juices from citrus fruit.

In the purchasing of citrus fruit, for example, in truckload lots to be used in the commercial production of citrus juices, the price paid is determined according to the amount of soluble solids or sugars in the juice obtained from representative samples of such fruit. It is preferred that small samples of the fruit, for example, forty to fifty pound batches be treated to extract juice therefrom so that these juices may be tested as above noted.

Various test methods and apparatus that have been employed, required objectionable amounts of time and involved considerable expense in endeavoring to accurately test representative samples of large quantities of fruit. In some instances insufficient amounts of juice are obtained per batch of fruit, to enable a reliable determination of the true amount of soluble solids in a particular lot of fruit.

In instances where fruit of many different sizes are to be tested, utilization of different machines may be required, each capable of handling a particular range of sizes, and such use of these machines still requires considerable sizing and handling of the fruit and the expenditure of a great deal of time per test.

Among the objections which have attended the sampling of citrus fruit for the purpose herein stated are that apparatus employed is large, cumbersome, space-consuming and in many instances unsuited for use in small, field-located test rooms usually available.

It is an object of this invention to provide juice extracting apparatus that is particularly designed for making accurate tests of representative samples of large amounts of citrus fruit and which constitutes an improvement in this art, in that the apparatus is exceptionally compact, simple to operate, takes up comparatively little space, may be operated as a single unit to quickly extract optimum amounts of juice from, for example, forty to fifty pound samples of truckload quantities of fruit of different types over a wide range of sizes.

It is another object of this invention to provide a juice extracting unit which makes it possible to quickly and inexpensively extract optimum amounts of juices from different kinds of citrus fruit, for example, oranges and grapefruit, either at the same time or separately with provision for separately collecting the juices extracted from each type of fruit.

It is a further object of this invention to provide novel and highly efficient juice recovery means for separating juice and pulp from peels and fruit parts discharged from an extraction zone of juice extracting apparatus whereby optimum amounts of juices may be quickly and economically obtained.

Another object of this invention is to provide apparatus of the character described which may be used for producing large amounts of juice, in other words, as a commercial juice production machine as well as for the test purposes hereinbefore noted, in that as a simply constructed and compact unit, it may be operated economically, continuously and quickly to produce optimum amounts of finished juice of good quality from whole fruit over a wide range of sizes continuously fed thereto without use of extraneous juice finishing means.

A further object of this invention is to provide novel juice and pulp recovery means comprising two stages or sections for continuously treating spent fruit, pulp and other waste portions of fruit discharging from the extraction zone of the extraction apparatus with which the recovery means is unitized, whereby all the juice clinging to such spent fruit, pulp and other waste fruit parts will be quickly and thoroughly recovered.

Other objects and advantages of the invention will be hereinafter described or will become apparent to those skilled in the art, and the novel features of the invention will be defined in the appended claims.

Referring to the drawings:

FIG. 4 is a fragmentary sectional view taken on the line 4—4 of FIG. 2, on an enlarged scale;

FIG. 5 is a sectional view taken on the line 5—5 of FIG. 4, on an enlarged scale;

FIG. 6 is an enlarged sectional view taken on the line 6—6 of FIG. 4;

FIG. 9 is an enlarged fragmentary sectional view taken on the line 9—9 of FIG. 2.

The present invention, as shown in the accompanying drawings, constitutes an improvement in juice extracting apparatus of the type shown in U.S. Letters Patent Nos. 2,767,644 and 2,767,645, both issued on October 23, 1956 to F. W. Bireley, wherein whole citrus fruit, while being advanced in a given direction, is bisected, has slits cut across the cut faces and rind edges of the fruit halves, and such halves are then compressed in a juice extraction zone with progressively increasing pressures to extract the juice therefrom, the juice and spent fruit halves being discharged from the extraction zone in different directions.

Figure 1:
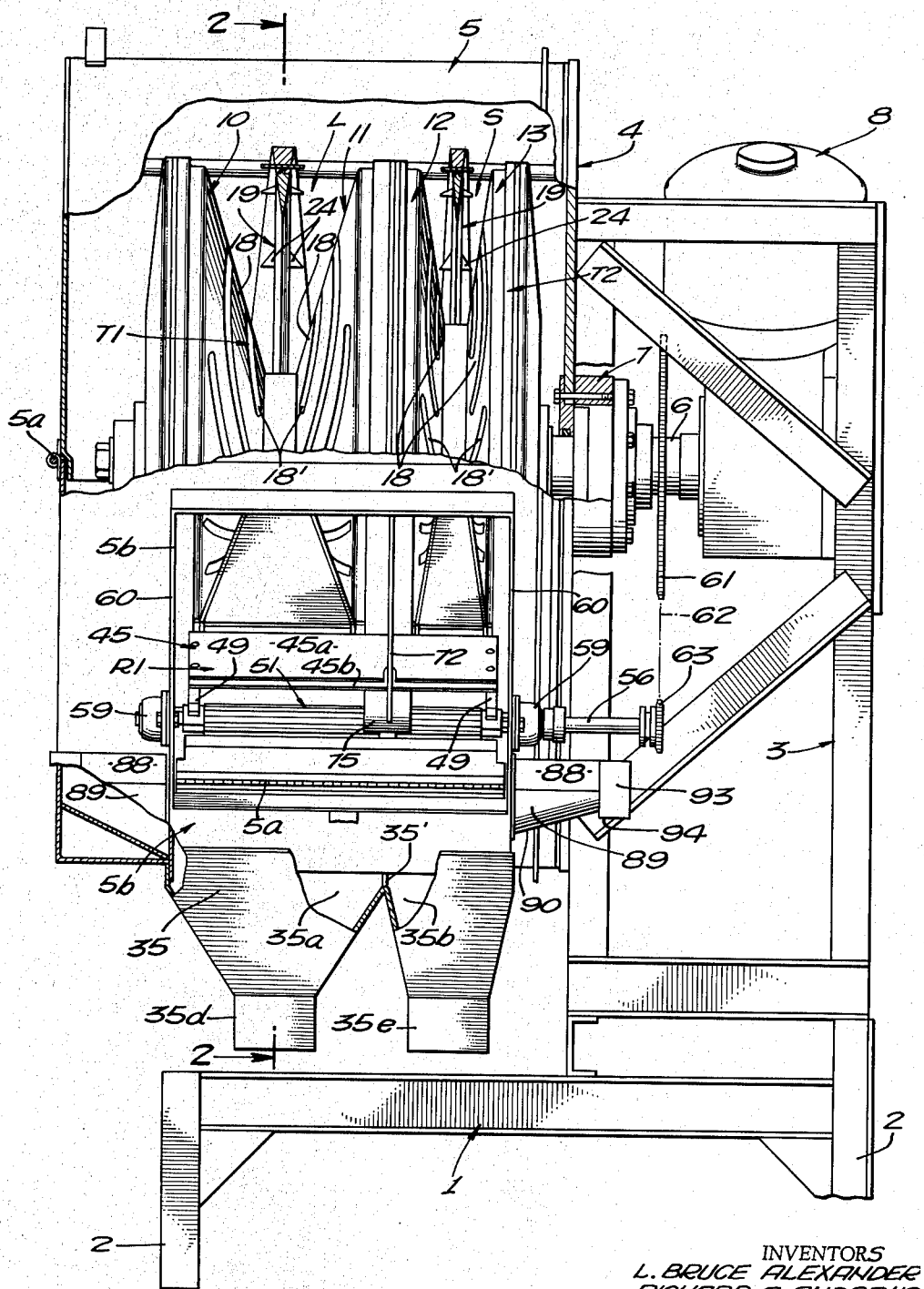
FIG. 1 is an elevational view partly in section of juice extracting apparatus embodying the present invention.

As shown in FIG. 1, an illustrative embodiment of this invention includes a base 1 supported on legs 2 and in turn supporting an upright frame 3 on which latter is mounted a generally circular bulkhead 4 to which is joined a sectional housing 5. Sections of the housing are hingedly joined as at 5a, whereby the housing may be readily opened for access to the elements contained therein.

A rotary shaft 6 journalled in a bearing 7 on the bulkhead 4 extends into the housing 5 and is driven by suitable means including a motor 8 supported on the frame 3.

Keyed on the shaft 6 within the housing are like circular and concavo-convex disks 10, 11, 12 and 13 for receiving fruit therebetween and advancing the fruit through extraction zones which will be hereinafter described. The disks 10 and 11 have their convex faces disposed in opposed spaced relation while the disks 12 and 13 have their convex faces similarly opposed. As here shown, the disks 10 and 11 diverge at a greater angle than the disks 12 and 13 to form a fruit advancing path L for fruit of the larger sizes, for example, grapefruit. The more closely spaced or less divergent disks 12 and 13 define therebetween a fruit advancing pathway S for the smaller sizes of fruit, for example, oranges.

Suitable means, not shown, are provided for feeding whole fruit through openings 15 in the upper rear portions of the housing 5 so that this fruit will be deposited onto chutes 16 and rolled thereon into the respective pathways L and S, there being an opening 15 and a chute 16 for each pathway and a partition plate 17 between the upper ends of the chutes and adjacent the opening 15 to confine the fruit to the respective pathways.

As the whole fruit rolls off of the chutes 16, it will become wedged in the pathways L and S at different levels from the axes of the rotary disks according to the sizes of the fruit, there being rubber facing members 18 covering the opposed convex faces of the rotary disks for yieldably gripping the fruit without crushing or abraiding the rind and releasing rind oils. These facing members may be spirally or otherwise ribbed as at 18' to provide a more reliable gripping and advancing of the fruit in the pathways L and S.

Mounted in each of the pathways L and S is an arcuate bisecting knife 19 arranged so that whole fruit advanced thereagainst will be bisected. The inner end of the knife 19 is secured to a stationary member 20 surrounding the shaft, while the outer end of the knife is supported on a rod 22 carried by the bulkhead 4.

The fruit halves advancing past the knife 19 encounter slitting knives 24 carried on the back of the knife so as to cut slits across the cut faces and rind edges of the fruit halves.

Each pathway L and S as it continues from the knife 19, forms an arcuate juice extracting zone extending around the axes of the disks 10–13 and which, for example, may have an arcuate extent of approximately 180°. A juice extracting zone is defined in each of the pathways L and S by means of an arcuate partition plate 26 and a pair of perforated pressure plates 27 and 28 which, in cooperation with the associated pair of rotary disks, form two pressure paths P1 and P2 through which the fruit halves are advanced to extract the juice therefrom. These paths terminate at a discharge zone D at the ends of the pressure paths where the spent fruit halves are discharged.

The lower transverse end of the partition plate 26 is fixed as at 32 in any suitable manner to the transverse upper edges of the pressure plates 27 and 28 so that the desired continuity of the two pressure paths P1 and P2 is provided whereby the fruit halves leaving the plate 26 will slide freely onto the outer faces of the plates 27 and 28 during the advance of the halves in the pressure paths.

The partition plate 26 in each pathway is gradually increased in thickness in the direction of advance of the fruit halves along opposite sides thereof. As here shown, the partition plate is formed of two opposed plate sections 26a providing a space 26b therebetween. These sections are perforated so that juice extracted from the fruit advancing along the partition plate will flow into the space 26b then into juice collecting means to be hereinafter described.

The perforated pressure plates 27 and 28 are arranged to provide outer surfaces which extend somewhat spirally in the direction of advance of the fruit, whereby, with the surfaces of the associated rotary disks opposed thereto, the pressure paths will converge in the direction of advance of the fruit halves. In other words, the pressure plates 27 and 28 in each pathway L and S diverge radially from the inner arcuate edges thereof with a progressive increase in the extent of divergence in the direction of advance of the fruit. With this arrangement, each pressure path is gradually constricted in the direction of advance of the fruit and this provides for progressively increasing the pressure on the fruit halves to the extent that they will become substantially flattened to obtain the greatest possible yield of juice before being discharged at the discharge zone D.

The lower arcuate edges of the plates 26, 27 and 28 are provided with laterally extended flanges 34 which, as shown in FIG. 9, extend close to the associated rotary disks and act as traps or baffles to catch pulp, seeds and like waste fruit parts that are released when extracting the juice, such parts being prevented from passing through the small perforations in the plates 26, 27 and 28. Juice adhering to these waste parts will run off the outer edges of the flanges 34 and be collected in juice collecting means to be hereinafter described. The waste parts on the flanges 34 are carried around by the rotatable disks and finally discharged into the discharge zone D.

The perforations in the plates 26, 27 and 28 are preferably comparatively small so as to screen out the pulp, seeds, etc., and to allow the juice to pass through the perforations and flow into the space between the plates for gravitation into a divided juice collecting well 35 having a partition 35' providing a compartment 35a for juice derived from the pathway L and a compartment 35b for juice derived from the fruit treated in the pathway S. The well 35 is detachably joined to the housing 5 so as to constitute the lower portion of the housing, it being noted that the housing is open opposite this well and is also open as at M opposite the discharge zone D. A latch unit 35c is provided as shown in FIG. 2 to detachably hold the well 35 joined to the housing 5.

Figure 2:
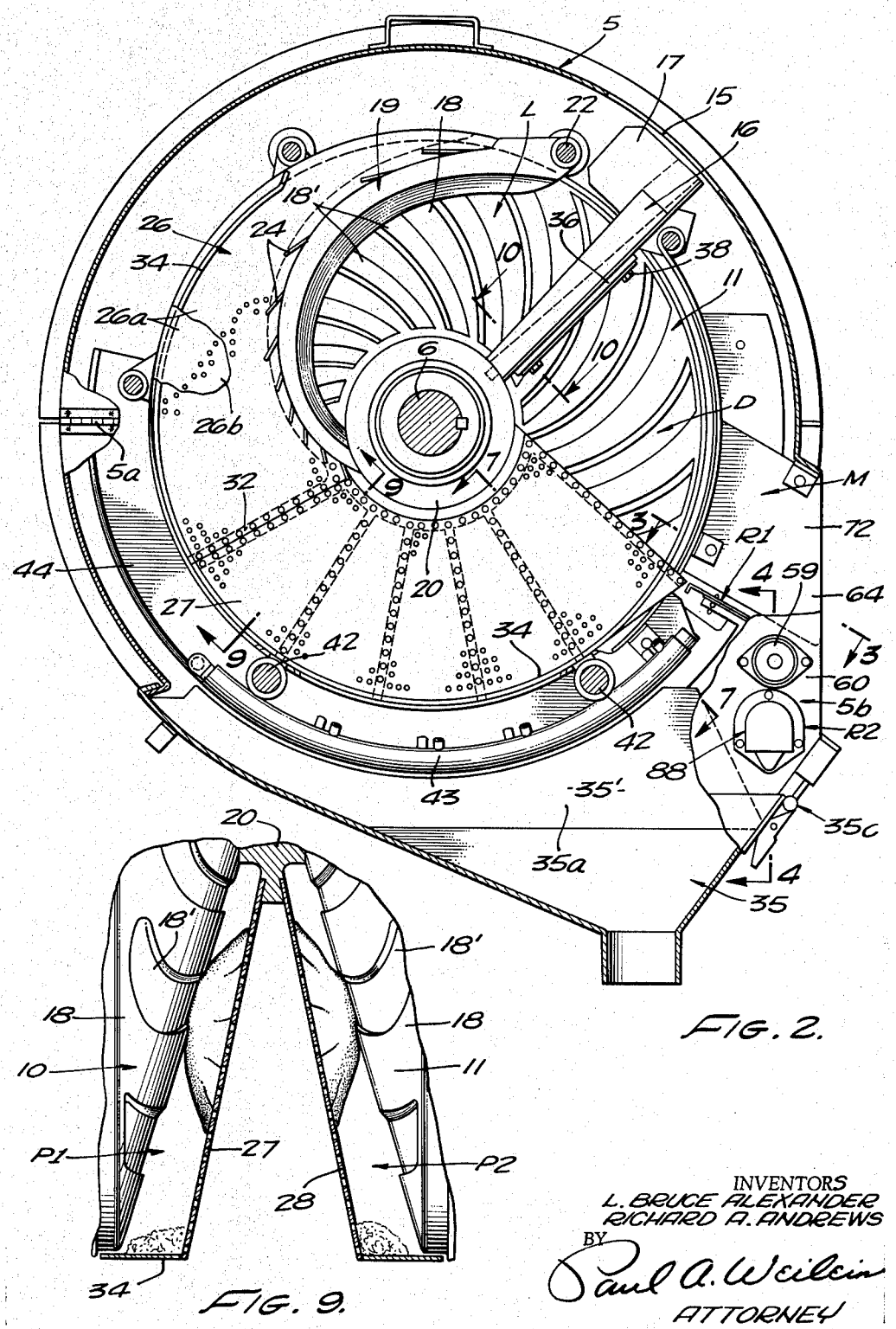
FIG. 2 is a vertical sectional view taken on the line 2—2 of FIG. 1.
Figures 3, 10:
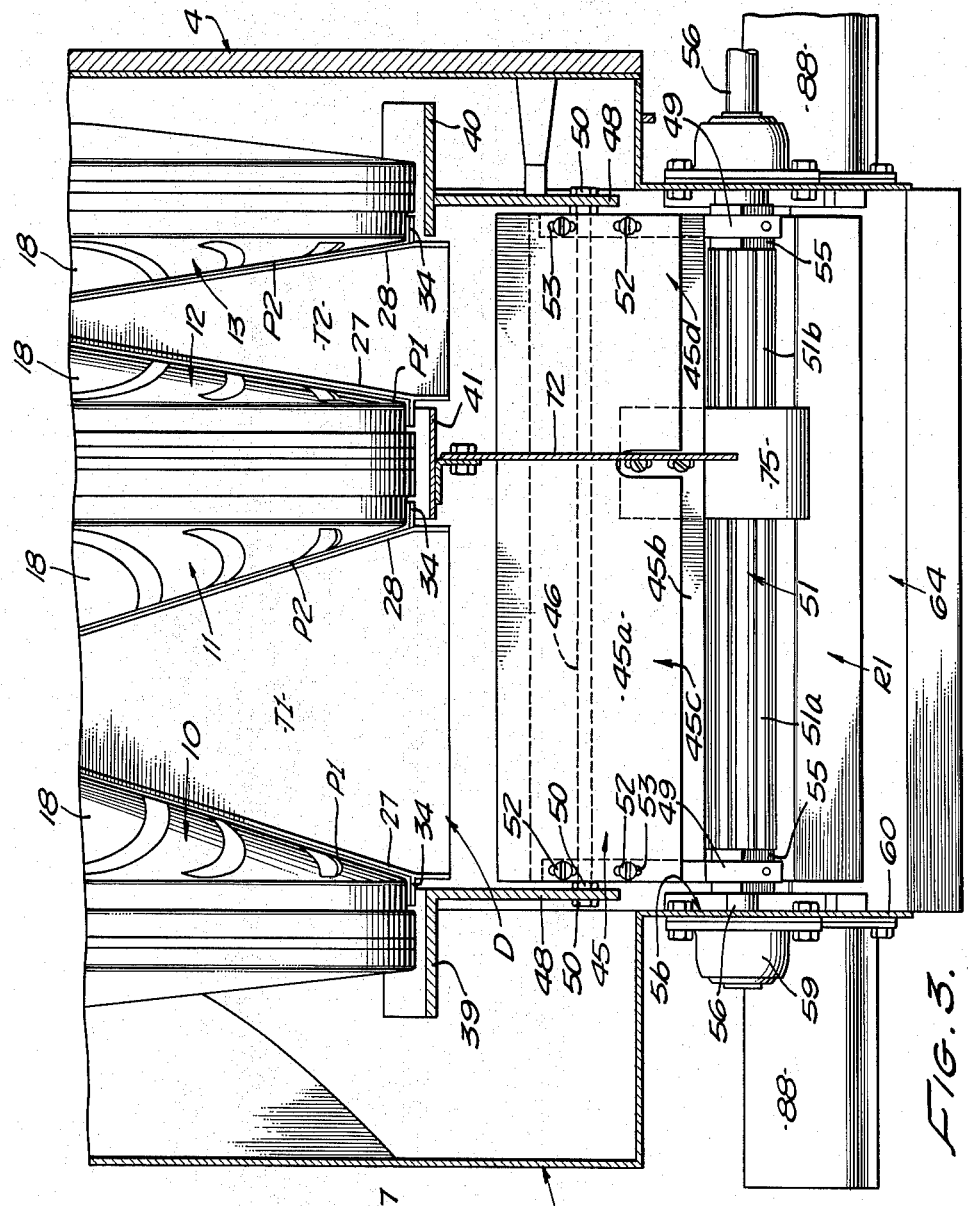
FIG. 3 is a fragmentary sectional view taken on the line 3—3 of FIG. 2, on an enlarged scale.
FIG. 10 is an enlarged fragmentary sectional view taken on the line 10—10 of FIG. 2.

Means are provided, as shown in FIGS. 2 and 10, for removing pulp, juice and other fruit parts that are carried on the surfaces of the rotary disks 10–13 and, as here shown, includes wiper blades 36 and 37 fixed by suitable fastenings 38 to each chute 16 so as to wipe off the surfaces of the associated pair of rotary disks. As here shown, the blades 36 and 37 are made of any suitable plastic material, for example, Teflon.

Figure 7:
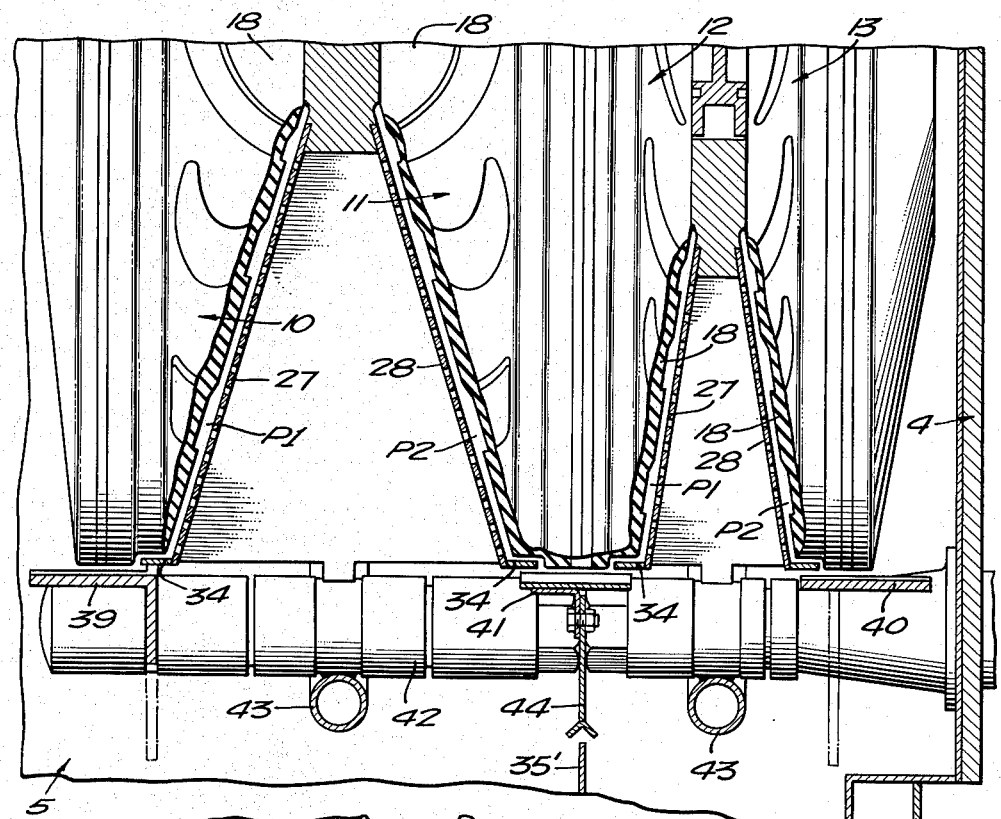
FIG. 7 is an enlarged sectional view taken on the line 7—7 of FIG. 2.

As shown in FIGS. 2, 3 and 7, splash guard plates 39 and 40 are provided adjacent the discharge zone D in the housing 5 adjacent the outermost disks 10 and 13 and a similar plate 41 is provided between the inner disks 11 and 12. These plates are supported by rods 42 projecting into the housing 5 from the bulkhead 4.

Arcuate spray pipes 43 are mounted in the lower portion of the housing 5 on the rods 42 to spray jets of water or other cleansing fluid onto the disks and elements associated therewith to clean them. These pipes are subject to connection in any suitable manner, not shown, with a source of supply of water or other cleansing fluid under pressure. Access to the apparatus within the sectional housing 5 may be had by removing or opening sections thereof, some of which are hinged as at 5a.

It will now be apparent that the apparatus thus far described is an improvement over similar extraction apparatus in constituting a compact, unitized structure consisting of two related juice extracting sections or units generally designated T1 and T2. These units are identical in construction, being different only as to size of the pressure paths therein, that the unit T1 is adapted for treating fruit of the larger sizes such as grapefruit, and unit T2 is operable for treating smaller size fruit such as oranges. These two sections or units are interrelated in such a manner that they may be very economically operated simultaneously or independently for quickly producing either in a continuous manner large quantities of citrus juice, or at intervals, comparatively small test amounts of juice. An arcuate partition plate 44 is supported on the splash guard plate 41 between the units T1 and T2 to separate the juices gravitating from these units.

This invention includes novel juice and pulp recovery means which are operable to increase the yield of juice beyond that heretofore achieved with a single juice extracting machine. This recovery means constitutes two sections or units designated R1 and R2 mounted in an extension 5b of the housing 5. The unit R1 is used for treating the spent fruit and fruit parts as it discharges at the discharge zone D, to recover some of the juice and pulp carried by the spent fruit and to separate the fruit rinds from the pulp and other fruit parts. The other unit R2 is operated to treat the pulp and fruit parts directed thereto from the unit R1 so as to extract from the pulp, the juice contained therein and to then discharge the total juice recovered by the unit R2 into the divided juice collecting well 35.

It should be noted that the units R1 and R2 of the juice and pulp recovery means extend across the discharge zone D, and the open portion M of the housing whereby these units will be operable to serve alike, the extraction units T1 and T2, to separately recover juice from spent fruit and fruit parts discharging through the zone D and open portion M of the housing.

Figure 8:
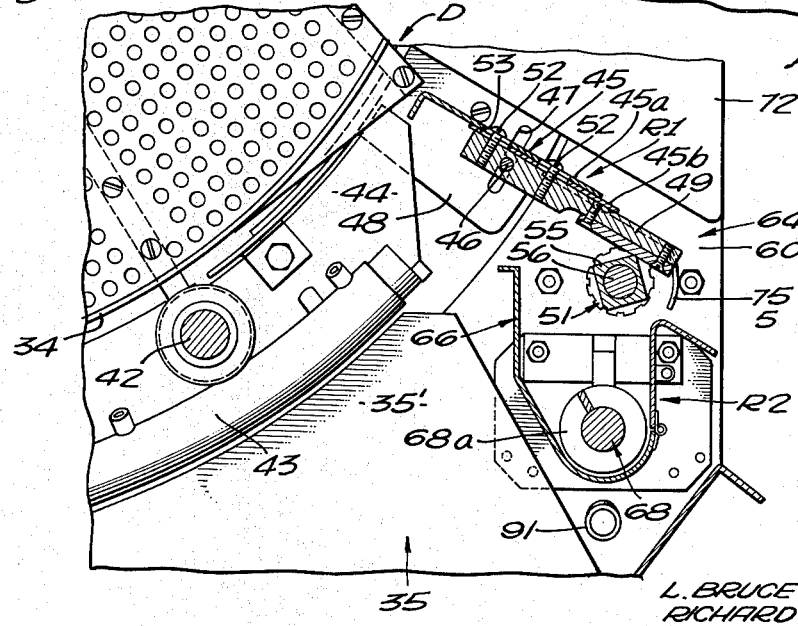
FIG. 8 is an enlarged fragmentary sectional view taken on the line 8—8 of FIG. 4.

The juice and pulp unit R1 as particularly shown in FIGS. 3 and 8, comprises a sectional, vibratory tray or plate 45 supported for pivotal movement on a pivot rod 46 and being inclined to cause juice, spent fruit and pulp to gravitate therefrom. The rod 46 is vertically adjustably mounted in slots 47 formed on extensions 48 of the splash plates 39 and 40, and extends through a pair of arms 49 carried by the vibratory plate 45. The slots 47 make it possible to raise and lower the pivot rod 46 and thereby correspondingly adjust the plate 45 to vary the inclination thereof. Nuts 50 are turned on threaded ends of the rod 46 so as to engage the extensions 48 supporting the rod, whereby the rod may be fixed in the desired adjusted position permitting the plate 45 to pivot thereon when vibrated. The sectional plate 45, as here shown, consists of an upper section 45a and a lower section 45b arranged so that they may be adjusted relative to one another to determine the spacing of the section 45a from the ends of the extraction zones of the units T1 and T2. The lower plate section 45b may be extended relative to the section 45a to vary the space between it and a roller 51 which is mounted below and forwardly of the plate section 45b. These adjustments are effected according to the size and nature of the fruit being treated, it being desired to space the upper edge of the plate section 45a from the discharge ends of the pressure paths P1 and P2 so that juice will gravitate between the plate 45 and the ends of paths P1 and P2 into the well 35 while the pulp, seeds and rinds will pass over this space onto the plate 45. The lower edge of plate section 45b is similarly spaced from the roller 51 so that rinds and other large waste fruit parts will be prevented from dropping into the recovery unit R2.

Adjustment of the plate sections is afforded by means of headed fastening elements 52 which pass through registering slots 53 in the two plate sections and are threaded into the arms 49. These fastenings serve the dual purpose of adjustably securing the plate sections together and fastening the arms 49 to the vibratory plate unit 45 as a whole. The arms 49 project forwardly from the plate and rest upon cam members 55 mounted on a shaft 56 extending through the roller 51. Upon rotation of the shaft 56 and the roller, the cam members 55, through contact with arms 49, will effect an intensive vibration of the plate 45. Vibrated in this manner, the plate 45 will agitate the spent fruit parts and pulp deposited thereon so as to release juice and pulp therefrom. Some of the juice and pulp will drop through the space between the pressure paths P1 and P2 and the upper edge of the plate section 45a into the divided juice collecting well 35.

The shaft 56 for the roller 51 is supported in bearing 59 on the side wall 60 of the housing extension 5b and is driven, as shown in FIG. 1, by means of a sprocket 61 on the main shaft 6 and a chain 62 mounted on this sprocket and a sprocket 63 on the shaft 56.

The roller 51, as here shown, may be longitudinally ribbed and rotated in a counterclockwise direction so that the spent fruit rinds coming into contact therewith will be prevented from dropping between the plate 45 and the roller and will pass freely over the roller. Pulp, seed and other small fruit parts coming in contact with the roller 51 will be carried around on the roller and discharged with the juice flowing off plate 45 between the roller 51 and the plate section 45b so as to drop into the pulp recovery unit R2. The rinds will be discharged from the roller 51 through an opening 64 in the housing extension 5b. It will now be apparent that the unit R1 functions to separate the fruit rinds from the pulp and other fruit particles and to direct the pulp and fruit particles into the unit R2 where further juice recovering is effected.

The pulp and juice recovery unit R2 is the finishing unit and is disposed beneath the unit R1 in the housing extension 5b, as shown in FIGS. 4 and 8. The unit R2 includes an elongate trough-like receptacle 66 which extends across the housing extension between the side walls 60, being secured to these walls in any suitable manner. The receptacle 66 is open along its upper side to receive juice and pulp discharged from the lower end of the plate 45 and from the roller 51.

A two-way feed screw 68 is supported in bearings 68' on the wall 60 of the housing section 5b so as to be operable in the receptacle 66. This two-way feed screw includes sections 68a and 68b for feeding the juice and pulp through the ends of the receptacle 66 into like finishing units 69 and 70. These finishing units are operable to thoroughly squeeze and extract juice from the pulp advanced thereto and to discharge the juice into the divided well 35, while the residual pulp is separately discharged as waste.

It should be noted that a vertical partition plate 72, as shown in FIG. 3, is attached to the guard plate 41 and divides the vibratory plate 45 so that the larger portion 45c of this plate will receive spent fruit from the larger extraction unit T1 while the smaller portion 45d of the plate will receive spent fruit from the smaller extraction unit T2. The plate 72 is in line with the partition plate 44, therefore separating the discharge of spent fruit from units T1 and T2.

The roller 51 is divided into two sections 51a and 51b which are aligned with the plate sections 45c and 45d, respectively. However, the receptacle 66 is not divided, although the feed screw 68 is divided into sections 68a and 68b aligned with the corresponding sections of the plate 45 and roller 51. Accordingly, juice and pulp delivered into the receptacle 66 from the plate section 45c and the roller section 51a will be advanced by the feed screw section 68a into the finisher unit 69, whereas the pulp and juice deposited into the receptacle 66 from the plate section 45d and the roller 51b will be advanced by the screw section 68b into the finishing unit 70, since the screw blade of the section 68b is arranged in a reverse spiral, compared to the blade of section 68a.

The feed screw 68 is driven from the roller 51 which has a sprocket 72' thereon for driving a chain 73 extending around the sprocket 74 on the feed screw. These sprockets serve as dividers for the sections of the roller 51 and feed screw 68, respectively.

A guard plate 75 overlies the chain and sprocket drive means for the feed screw, as shown in FIGS. 3 and 4, being supported on the plate 45.

Each of the finishing units 69 and 70 comprises a conical perforated screen member 77 suitably secured to the exterior of one of the walls 60 of the housing section 5b with the larger end of the screen member registering through an opening 79 in the wall 60 with one end of the trough-like receptacle 66. A tapered feed screw 80 is mounted in the screen member 77 for rotation therein in such close relation to the perforate walls of the screen member as will cause the pulp and any other fruit parts being advanced by the feed screw to be throughly compressed for releasing all the juice therein. The juice will flow out through the perforations in the member 77 and the pulp will be discharged at the outer end of the screen member.

The screw feed member 80, as shown in FIG. 5, is keyed on a shaft 82 extending therethrough and suitably drivingly coupled as at 83 to an end portion of the feed screw 68. The shaft 82 and the smaller end of the conical screw 80 extend out through the open smaller end of the conical screen member 77. A sleeve 85 surrounds the outer end of the screw member 80 and defines with the opposed inner surfaces of the screen member 77, a small annular pulp discharge outlet 86, the sleeve being held in place by a fastening 87 threaded into the end of the shaft 82.

Each of the finishing units 69 and 70 is mounted in a small housing 88 secured as shown in FIG. 4 to the exterior of the adjacent side wall 60 of the housing section 5b. Each housing 88 is provided with downwardly converging side walls 89 and a bottom wall 90, which latter slopes toward a discharge spout 91 to provide for a free flow of juice to the spout. This spout extends as shown in FIG. 4 into the juice collecting well 35 so as to discharge all the juice extracted through the associated screen member 77 into this well. Pulp discharged from the outlet 86 drops into a partitioned-off section 93 of the housing 88, which section is open as at 94 on its lower side so that the waste pulp will be discharged exteriorly of the apparatus. The exterior of each of the conical screen members 77 may be provided adjacent the smaller end portion thereof with annular baffle plates 95 which surround the conical member to prevent juice on the exterior of the conical member from flowing out into the partitioned-off section 93 into which the pulp is discharged. With reference to FIG. 3, it will be apparent that the juice recovered from the finishing unit 69 relative to the extraction unit T1, will be discharged from the spout 91 of unit 69 into the compartment 35a of the divided well 35. The juice recovered from the finishing unit 70 relative to the extraction unit T2 will flow from spout 91 of unit 70 into the compartment 35b of the divided well 35. The compartments 35a and 35b have discharge spouts 35d and 35e at the lower ends for separately taking off juices therefrom.

It should be noted that the finishing units 69 and 70 provide for extraction of all of the juices that may be contained in the pulp fed to these units and so that the juice issued therefrom will be in the finished state for addition to the juice already collected in the divided well 35.

By having the two sections R1 and R2 of the juice and pulp recovery unit unified, as here shown, with the particular extracting units T1 and T2, provision is made for quickly and inexpensively obtaining a greater amount of juice than hereto from representative samples of large amounts of fruit so that tests of such juice may be made to determine accurately the amount of soluble solids contained in the fruit being tested. However, it is to be understood that the juice and pulp recovery means comprising the sections R1 and R2 thereof could be used to advantage for recovering juice from spent fruit derived from juice extracting apparatus other than the apparatus here shown.

It is important to note that the apparatus of this invention constituting a single machine of a compact nature, serves the purpose of two separate juice extracting machines, each requiring use of a separate juice recovery or finishing means, in that the single machine provides two extraction units T1 and T2 in a single housing operated on a single shaft; and in that the juice recovery units R1 and R2 are joined or unitized with the extraction apparatus T1 and T2 in a particularly advantageous manner.

Fruit continuously fed to the two units T1 and T2 or either of them will be quickly treated to produce optimum amounts of juice of good quality with the apparatus as a whole taking up comparatievly little space and being most economically operated.

Moreover, it should be noted that the apparatus of this invention constitutes a dual purpose machine in that it may be efficiently used as a test machine or as a production machine for continuously producing large quantities of juice from fruit over larger ranges of sizes than has been possible heretofore with a single extraction machine.

While specific structural details have been shown and described, it should be understood that changes and alterations may be resorted to without departing from the spirit of the invention as defined in the appended claims.

We claim:

1. In apparatus for extracting juice from citrus fruit; means providing a pressure path for subjecting fruit to juice extracting pressure so that juice will gravitate therefrom; means for advancing fruit through said path to so extract juice from the fruit and then discharge the spent fruit rinds, pulp and fruit particles from said path in a direction away from the juice gravitating from said path; a receptacle disposed beneath said path for receiving the juice thus extracted; separating means positioned to one side of said pressure path; means for separating the rinds from the pulp and other fruit particles and discharging pulp and fruit particles in one direction and the spent fruit rinds in another direction; a second receptacle into which said pulp and other fruit particles are deposited by said separating means; and means operable in said second receptacle for expressing juice from said pulp and other particles and discharging the recovered juice into said first named receptacle.

2. In apparatus for extracting juice from citrus fruit; means providing a pressure path for subjecting fruit to juice extracting pressure so that juice will drop from said path; means for advancing fruit through said path to extract juice from the fruit and then discharge the spent fruit rinds from said path in a direction away from the juice dropping from said path; means for collecting the juice thus extracted; a juice recovery means positioned in the path of said discharging spent fruit rinds operable for receiving and agitating the spent fruit rinds to separate juice and pulp therefrom; means for agitating said recovery means including a rotary member operatively engaged therewith and over which the rinds are discharged; said recovery means effecting the discharge of the juice and pulp in a predetermined path; and a second juice recovery means disposed in said predetermined path for receiving said juice and pulp and operable for extracting juice from the pulp and separately discharging the juice and spent pulp so that the juice is discharged into said juice collecting means.

3. In apparatus for extracting juice from citrus fruit; means providing a pressure path for subjecting fruit to juice extracting pressure so that juice will gravitate therefrom; means for advancing fruit through said path to so extract juice from the fruit and then discharge the spent fruit from said path in a direction away from the juice dropping from said path; a first receptacle for collecting the juice thus extracted; a member positioned to receive said spent fruit; means for moving said member to release juice and pulp from said spent fruit thereon and to separately discharge the spent fruit and juice and pulp from said member; a second receptacle positioned beneath said member for receiving only said juice and pulp released from said member; and finishing means operable within said second receptacle for extracting juice from the pulp content of said second receptacle and to discharge juice into said first receptacle.

4. In apparatus for extracting juice from citrus fruit; means providing a pressure path for subjecting fruit to juice extracting pressure; means for advancing fruit through said path to cause juice from the fruit to be discharged in a predetermined path, and then discharge the spent fruit in a direction away from said predetermined path; a first receptacle into which the juice thus extracted is deposited; a second receptacle spaced laterally from said predetermined path for collecting juice and pulp derived from spent fruit discharged from said pressure path; means interposed between said pressure path and said second receptacle disposed above the latter and operable for treating said spent fruit so as to release juice and pulp therefrom into said second receptacle; said treating means including a rotary member disposed to contact said spent fruit; and means within said second receptacle operable for extracting juice from pulp contained therein and for separately discharging all juice and the spent pulp from said second receptacle.

5. In apparatus for extracting juice from citrus fruit; means providing a pressure path for subjecting fruit to juice extracting pressure so that juice will gravitate therefrom apart from pulp and rinds; means for advancing fruit through said path to so extract juice from the fruit and then discharge the spent fruit from said path in a direction away from the juice gravitating from said path; a first receptacle for collecting the juice thus extracted; means for separating the pulp and other fruit particles from the spent rinds discharging from said pressure path; a second receptacle disposed to receive pulp and fruit particles discharged from said separating means; a screen member operatively connected with said second receptacle; said screen member having perforations for releasing juice; said second receptacle having a juice outlet into which juice flows from said perforations and which leads into said first receptacle; said receptacle also having a second outlet for said pulp and other fruit particles; feed means in said second receptacle for forcing said pulp and said fruit particles toward said screen member; and a rotary member in said second receptacle cooperable with said screen member and said feed means for forcing said pulp and fruit particles against said screen member to press juice through said perforations into said juice outlet and discharge the spent pulp and other particles through said second outlet.

6. In apparatus for extracting juice from citrus fruit; means providing a pressure path for subjecting fruit to juice extracting pressure; means for advancing fruit through said path to extract juice and direct it from the fruit in one direction and then discharge the spent fruit from said path in another direction; a first receptacle for collecting the juice thus extracted; a separating member disposed out of the path of juice directed from said pressure path to receive spent fruit rinds, pulp and other fruit particles from said pressure path; means for vibrating said separating member to separate from said spent fruit rinds the pulp and other fruit particles and to effect the discharge of the pulp and fruit particles downwardly away from said spent fruit rinds; said vibrating means including a rotary member for engaging and discharging the pulp and fruit particles inwardly and downwardly therefrom; a second receptacle disposed to receive said pulp and fruit particles; a screen member operatively connected with said second receptacle; said screen member having perforations located to direct juice into said first receptacle and being provided with an outlet for the pulp and other fruit particles; feed means in said second receptacle for forcing pulp and fruit particles to said screen member; and a rotary member in said second receptacle cooperable with said screen member and said feed means for forcing pulp and said particles against said screen member to press juice therefrom into said first receptacle, and discharge the spent pulp and other particles through said outlet.

7. In apparatus for extracting juice from citrus fruit; means providing a pressure path for subjecting fruit to juice extracting pressure; means for advancing fruit through said path to extract juice from the fruit and direct the juice downwardly therefrom and then discharge the spent fruit from said path in a direction away from the downwardly directed juice; a first receptacle into which the juice thus extracted is directed; a separating member inclined outwardly and downwardly from said pressure path to receive spent fruit rinds, pulp and other fruit parts from said pressure path; means for vibrating said separating member to separate the pulp and other fruit parts from the spent fruit rinds and to discharge said pulp and fruit parts downwardly from said separating member; said vibrating means including a roller positioned adjacent the lower end of said separating member for contacting pulp and other fruit parts leaving said separating member and discharging it downwardly therefrom; cam means on said roller; said roller preventing said rinds from following said downward movement of said pulp and fruit parts; arms on said separating member engaging said cam means for effecting vibration of said separating member; a second receptacle disposed to receive the pulp and fruit parts discharged from said separating member and said roller; and means operable within said second receptacle for subjecting the pulp and fruit parts therein to juice extracting pressure and separately discharge juice and spent pulp and fruit parts therefrom.

8. In apparatus for extracting juice from citrus fruit; means providing a pressure path having a discharge end and provided with means for subjecting fruit to juice extracting pressure so that juice will gravitate progressively along said path from said fruit, means for advancing fruit through said path to effect said gravitation of juice from the fruit and then discharge the spent fruit rinds, pulp and other fruit parts from said path in a direction away from the juice gravitating from said path; a first receptacle for collecting the juice thus extracted; a second receptacle for said pulp and other fruit parts disposed to receive pulp discharged from said pressure path; means interposed between said advancing means and said second receptacle for separating said pulp and fruit parts from the spent fruit rinds and depositing said pulp and other fruit parts into said second receptacle; a conical screen member operatively connected with said second receptacle; said screen member having juice discharge perforations between its ends disposed to direct juice into said first receptacle and an outlet for pulp and other fruit parts at one end; a feed screw operable in said second receptacle to advance pulp and fruit parts into said screen member; and a conical screw member operable in said member to force pulp and said fruit parts under pressure through said screen member to extract juice from the pulp and fruit parts and force the juice through said perforations and the spent pulp and fruit parts through said outlet.

9. In apparatus for extracting juice from citrus fruit; means providing a pressure path for subjecting fruit to juice extracting pressure and effecting gravitation of juice progressively along said path; means for advancing fruit through said path to so effect said gravitation of juice from the fruit and then discharge from an end of said path in a direction away from the juice gravitating from said path the spent fruit rinds, pulp and other fruit parts; a first receptacle for collecting the juice thus extracted; a member spaced from the path of juice gravitating from said pressure path and supported in position to receive and pass thereover spent fruit rinds, pulp and other fruit parts discharged from said end of said pressure path; said member being laterally spaced from said end of said pressure path sufficiently to permit juice discharging at said end of said pressure path to drop between said member and said end into said first receptacle; said spacing of said member being such that fruit rinds, pulp and fruit parts will pass thereover onto said member; a second receptacle disposed beneath said member; means operatively associated with said member for directing said pulp and other fruit parts into said second receptacle and excluding said rinds from entering said second receptacle; and means operable in said second receptacle for subjecting said pulp and fruit parts therein to juice extracting pressure and discharging the resultant juice into said first receptacle.

10. In apparatus for extracting juice from citrus fruit; means providing a pressure path having a discharge end; said means including provision for subjecting fruit to juice extracting pressure and effecting gravitational discharge of the juice progressively along said path; means for advancing fruit through said path to so extract juice from the fruit and then discharge from said discharge end of said path the spent fruit rinds, pulp and other fruit parts; a first receptacle for collecting the juice thus extracted; a member supported in an inclined position to receive and pass thereover spent fruit, rinds, pulp and other fruit parts discharged from said end of said pressure path; said inclined member being laterally spaced from said discharge end of said pressure path sufficiently to permit juice discharging at said end to drop between said inclined member and said end into said first receptacle; said spacing of said inclined member being such that fruit rinds, pulp and fruit parts will pass thereover onto said inclined member; a second receptacle disposed beneath said inclined member and over said first receptacle; means operatively associated with said inclined member for directing said pulp and other fruit parts into said second receptacle and excluding said rinds from entering said second receptacle; means operable in said second receptacle for subjecting said pulp and fruit parts therein to juice extracting pressure; and means for conducting the juice derived from operation of said last named means into said first receptacle.

11. Apparatus for separating pulp and other fruit particles from the rinds of citrus fruit that has been subjected to juice extracting pressure to obtain the major portion of the juice therefrom, comprising: inclined vibrating means operable upon placing the fruit rinds thereon for releasing pulp and fruit particles from the fruit rinds; a receptacle disposed to receive pulp and fruit particles discharged from said vibrating means; means located above said receptacle and in the path of pulp and fruit particles released from said releasing means for directing the pulp and fruit particles into said receptacle; a screen member operatively connected with said receptacle; said screen member having perforations for discharging juice therefrom and an outlet for spent pulp and other fruit particles; means operable in said receptacle to convey said pulp and fruit particles to said screen member; and means cooperable with said screen member for pressing said pulp and said particles against said screen member to separate juice therefrom for discharge through said perforations and to discharge the spent pulp and particles through said outlet.

12. In fruit juice extracting apparatus: a first pair of opposed circular members for gripping fruit therebetween; a second pair of opposed circular members for gripping fruit therebetween disposed to one side of said first pair; said second pair of circular members being spaced one from the other a different extent than said first pair; means for supporting and rotating said pairs of circular members including a shaft common to said pairs of circular members; a pair of arcuate perforated members mounted between the circular members of each pair to define therewith arcuate pressure paths through which fruit is moved to express juice therefrom and from which spent fruit is discharged in response to rotation of said circular members; an agitating member extending transversely of said pairs of circular members; means for supporting said agitating member to one side of said pairs of circular members and opposite one end of said path in a position to receive said spent fruit; means for vibrating said agitating member to separate juice and pulp from spent fruit in contact with said agitating member; partition means associated with said agitating member for confining the spent fruit discharged by said first pair of circular members to a predetermined portion of said agitating member and for confining the spent fruit discharged from the second pair of said circular members to another portion of said agitating member; an elongate receptacle extending transversely of and beneath said portions of said agitating member in position to collect in different parts thereof juice and pulp derived from said portions of said agitating member; and means cooperable with each of said different parts of said receptacle for extracting juice from the pulp in said receptacle and separately discharging juice and spent pulp from said receptacle.

13. In fruit juice extracting apparatus: a first pair of opposed circular members for gripping fruit therebetween; a second pair of opposed circular members for gripping fruit therebetween disposed to one side of said first pair; said second pair of circular members being spaced one from the other a different extent than said first pair; means for supporting and rotating said pairs of circular members including a shaft common to said pairs of circular members; a pair of arcuate perforated members mounted between the circular members of each pair to define therewith arcuate pressure paths through which fruit is moved to express juice therefrom and from which spent fruit is discharged in response to rotation of said circular members; an agitating member extending transversely of said pairs of circular members in position to contact said spent fruit; means for vibrating said agitating member to separate juice and pulp from spent fruit in contact with said agitating member; partition means associated with said agitating member for confining the spent fruit discharge by said first pair of circular members to a predetermined portion of said agitating member and for confining the spent fruit discharged from the second pair of said circular members to another portion of said agitating member; an elongate receptacle extending transversely of said portion of said agitating member in position to collect in different parts thereof juice and pulp derived from said portions of said agitating member; screw feed means in said receptacle for advancing fruit and pulp toward opposite ends of said receptacle; and finishing means operable at said opposite ends of said receptacle for treating the juice and pulp advanced by said screw feed to extract juice from the pulp and separately discharging juice and spent pulp.

14. In fruit juice extracting apparatus: a first pair of opposed circular members for gripping fruit therebetween; a second pair of opposed circular members for gripping fruit therebetween disposed to one side of said first pair; said second pair of circular members being spaced one from the other a different extent than said first pair; means for supporting and rotating said pairs of circular members including a shaft common to said circular members; a pair of arcuate perforated members mounted between the circular members of each pair to define therewith arcuate pressure paths through which fruit is moved to express juice therefrom and from which spent fruit is discharged in response to rotation of said circular members; an agitating member extending transversely of said pairs of circular members in position to contact said spent fruit; means for vibrating said agitating member to separate juice and pulp from spent fruit in contact with said agitating means; partition means associated with said agitating member for confining the spent fruit discharged by said first pair of circular members to a predetermined portion of said agitating member and for confining the spent fruit discharged from the second pair of said circular members to another portion of said agitating member; an elongate receptacle extending transversely of said portions of said agitating member in position to collect in different parts thereof juice and pulp derived from said portions of said agitating member; a hollow screen member at each end of said receptacle; said screen member having a perforated wall for passing juice therethrough and an outlet for spent pulp; and means cooperable with said receptacle and said screen members for pressing the pulp against said perforate wall to pass juice through the perforations therein and discharge spent pulp through said outlet.

15. In fruit juice extracting apparatus, the embodiment comprising: means for expressing the juice and pulp from parts of the fruit and for discharging spent fruit parts; a pair of receptacles disposed so that one collects the juice apart from the rinds and pulp and the other collects the pulp derived from said expressing means; and means for extracting juice from the pulp and separately discharging the extracted juice and spent pulp; said last named means including a screen arranged to receive pulp from said pulp collecting receptacle; said screen having an outlet for spent pulp; and means cooperable with said screen for forcing the pulp from said receptacle against said screen to express juice from the pulp to discharge the juice through said screen and discharge the spent pulp apart from the juice and rinds from said outlet.

16. In fruit juice extracting apparatus, the embodiment comprising: means for expressing the juice and pulp from parts of the fruit and for discharging spent fruit parts; a pair of receptacles disposed so that one collects the juice free of the rinds and pulp and the other collects the pulp free of the juice and rinds derived from said expressing means; means for extracting juice from the pulp and separately discharging the extracted juice and spent pulp; said last named means including a screen arranged to receive pulp from said pulp collecting receptacle; said screen having an outlet for spent pulp; means cooperable with said screen for forcing the pulp from said receptacle against said screen to express juice from the pulp to discharge the juice through said screen and discharge the spent pulp from said outlet; and means cooperable with said screen for conducting juice therefrom into said juice collecting receptacle.

17. Apparatus for extracting juice from cut portions of citrus fruit comprising: means providing a pressure path having a discharge end; said pressure path means having means embodied therein for subjecting the cut portions of the fruit to juice extracting pressure such that juice will gravitate from the cut fruit progressively along said path during advance of the fruit in said path before reaching said discharge end; means providing a discharge path extending outwardly from said discharge end; means for so advancing the cut fruit along said pressure path operable for directing the fruit rinds and pulp onto said means providing said discharge path; a first receptacle extending beneath said means providing said pressure path and in the general direction of said advance of said fruit, for receiving said juice progressively gravitating from said means providing said pressure path; a second receptacle disposed in outwardly spaced relation to said discharge end; separator means connected with said means providing said discharge path operable to direct juice and pulp therefrom into said second receptacle and to discharge the rinds in a direction away from said two receptacles; means in said second receptacle for expressing juice from said pulp; means for discharging the juice expressed from said pulp in said second receptacle into said first receptacle; and means for discharging spent pulp from said second receptacle in a direction away from said two receptacles.

18. Apparatus for extracting juice from cut portions of citrus fruit comprising: means providing a pressure path having a discharge end; said pressure path means having means embodied therein for subjecting the cut portions of the fruit to juice extracting pressure such that juice will gravitate from the cut fruit progressively along said path during advance of the fruit in said path before reaching said discharge end; means providing a discharge path extending outwardly from said discharge end; means for so advancing the cut fruit along said pressure path operable for directing the fruit rinds and pulp onto said means providing said discharge path; a first receptacle extending beneath said means providing said pressure path and in the general direction of said advance of said fruit, for receiving said juice progressively gravitating from said pressure path; said means providing said discharge path being spaced from said discharge end in such a manner that some of the juice and pulp discharging from said discharge opening will gravitate between the discharge opening and the means forming the discharge path into said first receptacle; a second receptacle disposed in laterally spaced relation to said discharge end; separator means connected with said means providing said discharge path operable to direct juice and pulp therefrom into said second receptacle and to discharge the rinds in a direction away from said two receptacles; means in said second receptacle for expressing juice from said pulp; means for discharging the juice expressed from said pulp in said second receptacle into said first receptacle; and means for discharging spent pulp from said second receptacle in a direction away from said two receptacles.

19. Apparatus for extracting juice from cut portions of citrus fruit comprising: means providing a pressure path having a discharge end; said pressure path means having means embodied therein for subjecting the cut portions of the fruit to juice extracting pressure such that juice will gravitate from the cut fruit progressively along said path during advance of the fruit in said path before reaching said discharge end; means providing a discharge path extending outwardly and inclined downwardly from said discharge end; means for so advancing the cut fruit along said pressure path operable for directing the fruit rinds and pulp onto said means providing said discharge path; a first receptacle extending beneath said means providing said pressure path and in the general direction of said advance of said fruit, for receiving said juice progressively gravitating from said means providing said pressure path; a second receptacle disposed in laterally spaced relation to said discharge end; vibratory means connected with said means providing said discharge path operable to agitate said means providing said discharge path to cause juice and pulp thereon and on the rinds to gravitate into said second receptacle and to effect the discharge of the rinds in a direction away from said two receptacles; means in said second receptacle for expressing juice from said pulp; means for discharging the juice expressed from said pulp in said second receptacle into said first receptacle; means for discharging spent pulp from said second receptacle in a direction away from said two receptacles.

20. In fruit juice extracting apparatus, the embodiment comprising: means for expressing juice and pulp from parts of fruit and for discharging therefrom in separate paths the juice, pulp, and spent fruit parts; a first receptacle positioned so that juice free from pulp will flow uninterruptedly into said first receptacle; a second receptacle having an outlet for juice and an outlet for spent pulp; means for directing pulp from the separate path in which it is discharged from said expressing means into said second receptacle; and means operable in and cooperable with said second receptacle for expressing juice from the pulp therein and discharging the juice and pulp through respective juice and pulp outlets in said second receptacle.

21. Apparatus for separating pulp, juice, and other fruit particles from the rinds of citrus fruit that have been subjected to juice extracting pressure to obtain therefrom the major portion of the juice contained therein, and for combining the juice recovered from the rinds and pulp with said major portion of the juice, comprising: a first receptacle in which said major portion of the juice is contained; means operable upon placing the fruit rinds in contact therewith for releasing pulp and fruit particles from the fruit rinds; a second receptacle disposed to receive pulp and fruit particles discharged from said releasing means; a screen member operatively connected with said receptacle; said screen member having perforations for discharging juice therefrom and an outlet for spent pulp and other fruit particles; means operable in said receptacle to convey said pulp and fruit particles to said screen member; means cooperable with said screen member for pressing said pulp and said particles against said screen member to separate juice therefrom for discharge through said perforations and to discharge the spent pulp and particles through said outlet; and means for directing juice discharged from said screen member into said first receptacle.

22. Apparatus for extracting juice from citrus fruit comprising: means providing a pressure path in which the fruit is movable for extracting juice therefrom; said means including a perforate member on one side of which the fruit is movable in said path; rotary means axially spaced from said perforate member for advancing the fruit in said path against said one side of said perforate member; said path of movement of the fruit being circumferential of said rotary advancing means; said perforate member being so disposed and having perforations therein of such small size that juice exclusive of other fruit particles released from the fruit will pass through the perforations and gravitate from said path along the other side of said perforate member while said other particles released from the fruit will gravitate from said path along said one side of said perforate member; said juice and other particles released from the fruit gravitating in a direction transverse to said path; juice collecting means disposed to receive the juice gravitating from said path; and baffle means disposed on said one side of said perforate member and projecting axially therefrom and transversely of said path to prevent said released fruit particles from being deposited in said juice collecting means.

23. Apparatus for extracting juice from citrus fruit comprising: a rotary member; a perforate member having one side opposed to and axially spaced from said rotary member to define therewith a pressure path extending circumferentially of said member and in which the fruit is moved and subjected to axial juice extracting pressure between said members and then discharged from said path in a direction transversally of said path; said perforate member being so disposed and having perforations of such small size that the juice will pass through said perforations free from seeds and pulp released from the fruit and gravitate from said perforations in a direction transverse to said path on the other side of said perforate member; juice collecting means disposed to receive the juice gravitating from said perforate member; and baffle means beneath and extending in a direction axially from said one side of said perforate member and transversely of said path for preventing the seeds and pulp released from the fruit from gravitating into said juice collecting means.

24. Apparatus for extracting juice from citrus fruit comprising: a rotary member; a perforate member axially spaced from said rotary member and having one side opposed to said rotary member to define therewith a pressure path extending circumferentially of said members and in which the fruit is moved and subjected to axial juice extracting pressure between said members and then discharged from and in a direction transverse to said path; said perforate member being so disposed and having perforations of such small size that the juice will pass through said perforations free from seeds and pulp released from the fruit and gravitate from said perforations on the other side of said perforate member in a direction transverse to said path; juice collecting means disposed to receive the juice gravitating from said perforate member; and a flange on said perforate member beneath and transversely of said pressure path in an axial direction from said perforate member in such close proximity to said rotary member as to prevent the seeds and pulp from gravitating from said path into said juice collecting means.

25. Apparatus for extracting juice from citrus fruit comprising: a rotary member; a perforate member axially spaced from said rotary member and having one side thereof opposed to said rotary member to define therewith a pressure path extending circumferentially of said members and having an intake end and a discharge end and in which the fruit is moved and subjected to axial juice extracting pressure between said members and then discharged from said discharge end; said perforate member being so disposed and having perforations of such small size that the juice free from seeds and pulp will pass through said perforations and gravitate therefrom on the other side of said perforate member in a direction transverse to said path; juice collecting means disposed to receive the juice gravitating from said perforations; baffle means disposed beneath and extending in an axial direction from said one side of said perforate member and transversely of said path for collecting thereon the seeds and pulp released from the fruit and preventing the seeds and pulp from gravitating into said juice collecting means; and said rotary member and said baffle means being cooperable at said discharge end of said pressure path for removing the seeds and pulp from said baffle means.

26. Apparatus for extracting juice from citrus fruit comprising: a rotary member; a perforate member having one side thereof opposed to said rotary member to define therewith a pressure path having an intake end and a discharge end and in which the fruit is moved and subjected to juice extracting pressure and then discharged from said discharge end; said perforate member being so disposed and having perforations of such small size that the juice free from seeds and pulp will pass through said perforations and gravitate therefrom on the other side of said perforate member; juice collecting means disposed to receive the juice gravitating from said perforations; baffle means disposed beneath said one side of said perforate member for collecting thereon the seeds and pulp released from the fruit and preventing the seeds and pulp from gravitating into said juice collecting means; said rotary member and said baffle means being cooperable at said discharge end of said pressure path for removing the seeds and pulp from said baffle means; receptacle means for receiving the seeds and pulp discharged from said discharge end of said pressure path; means operable in said receptacle means to remove juice from said seeds and pulp; and means for directing the juice so removed from said seeds and pulp into said juice collecting means.

References Cited by the Examiner
UNITED STATES PATENTS

| | | | |
|---|---|---|---|
| 1,789,444 | 1/1931 | Mathewson | 146—3 X |
| 2,212,066 | 8/1940 | Fry. | |
| 2,513,974 | 7/1950 | Thomas. | |
| 2,515,748 | 7/1950 | Wallace et al. | 100—97 |
| 2,708,627 | 5/1955 | Toulmin. | |
| 2,769,472 | 11/1956 | Alexander et al. | 146—3 |
| 3,017,821 | 1/1962 | Bireley et al. | 100—97 |

WALTER A. SCHEEL, *Primary Examiner.*

CHARLES W. ROBINSON, *Examiner.*